United States Patent
Gross et al.

(10) Patent No.: US 8,675,231 B2
(45) Date of Patent: Mar. 18, 2014

(54) METHODS AND SYSTEMS FOR LOAD LEVELING IN A PRINT SHOP

(75) Inventors: Eric Michael Gross, Rochester, NY (US); Timothy Wayne Jacobs, Fairport, NY (US); Jack Gaynor Elliot, Penfield, NY (US); Sharath Srinivas, Webster, NY (US); Sudhendu Rai, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 214 days.

(21) Appl. No.: 13/236,074

(22) Filed: Sep. 19, 2011

(65) Prior Publication Data

US 2013/0070286 A1 Mar. 21, 2013

(51) Int. Cl.
*G06F 3/12* (2006.01)
*H04N 1/00* (2006.01)
*G06F 9/50* (2006.01)

(52) U.S. Cl.
CPC .......... *H04N 1/00949* (2013.01); *G06F 9/5038* (2013.01)
USPC ........................................ 358/1.15; 358/1.13

(58) Field of Classification Search
USPC ................................ 358/1.13, 1.15
See application file for complete search history.

(56) References Cited

U.S. PATENT DOCUMENTS

| | | | |
|---|---|---|---|
| 5,089,970 A | 2/1992 | Lee et al. | |
| 5,873,251 A | 2/1999 | Iino | |
| 6,434,443 B1 | 8/2002 | Lin | |
| 6,999,829 B2 | 2/2006 | Bazzocchi et al. | |
| 7,577,577 B2 | 8/2009 | Lyon et al. | |
| 7,797,189 B2 | 9/2010 | Rai et al. | |
| 7,953,681 B2 | 5/2011 | Rai | |
| 2009/0086266 A1* | 4/2009 | Nakashima | 358/1.15 |
| 2009/0327033 A1 | 12/2009 | Rai et al. | |
| 2010/0165376 A1* | 7/2010 | Matsuyama | 358/1.14 |

* cited by examiner

*Primary Examiner* — Benny Q Tieu
*Assistant Examiner* — Juan M Guillermety
(74) *Attorney, Agent, or Firm* — Fox Rothschild LLP (57) ABSTRACT

A method and system for managing print shop workflow determines whether variations in print shop workflow may be reduced by shifting one or more customers' scheduled orders to different time periods. By shifting an order from one time period to another, the system may reduce variability in demand levels over time, thus helping increase overall system efficiency. To do this, one or more customers are selected as candidates for print shop order rescheduling. The system identifies customer orders that, if moved to other time periods, will most reduce demand level variations. A user may accept the system's recommendations, or the system may present a user with several alternative load leveling options for selection. The system may then cause the orders to be printed based on the load leveling proposal and the user's selection.

14 Claims, 4 Drawing Sheets

METHODS AND SYSTEMS FOR LOAD LEVELING IN A PRINT SHOP

BACKGROUND

In many enterprise print shop environments, the demand (or job load) on the print shop can be reasonably predictable when averaged over a period of time. For example, the demand for any given month may be very similar to that of the previous month. However, even in print shops where the demand is predictable when averaged over a time period, the demand at specific times within the time period may be highly variable. In addition, even relatively predictable print shops often will experience time periods in which the actual demand is significantly higher or lower than the expected demand.

Due to the variability in job demand, an enterprise must maintain a certain level of inventory, such as ink, paper and the like, in anticipation of the jobs that the enterprise may receive. In addition, a print shop must maintain a certain level of equipment and staffing to satisfy the expected demand. If the demand exceeds the inventory or available resources, the print shop may not be able to satisfy the demand. If the demand drops below expected levels, the print shop may lose revenues by paying for resources that it does not need.

This document describes a method and systems for reducing variations in the load of a print shop.

SUMMARY

In an embodiment, a print shop workflow management system implements a method that maintains a data set of prospective print shop order data. The data represents orders for multiple customers over multiple unit time periods. Each of the unit time periods has a corresponding demand level based on all of the prospective print shop order data for the customers over that unit time period. The system determines a demand variation level that corresponds to a measurement of how the demand levels vary over each of the unit time periods. The system also selects a first customer as a candidate for print shop order rescheduling. The first customer has at least one print shop order with an original processing period that corresponds to one of the unit time periods in the set. The system modifies at least one of the first customer's print shop orders so that the modified order has a revised processing period that differs from the original processing period and corresponds to a different one of the unit time periods of the set. The modifying is performed so that movement of the modified order from the original processing period to the revised processing period will reduce the demand variation level. The system may then process the modified print shop order in the print shop during the revised processing period.

In various embodiments the process of determining what orders to shift to new time periods, and what time periods to use in the shifting, may include developing a matrix of data from the data set. Each row in the matrix corresponds to a customer, and each data point in each row of the matrix corresponds to a unit of measure for that row's customer's print shop orders per unit time period. The system may determine a set of values for the first customer, wherein each value in the set of values corresponds to a measurement of the first customer's print shop orders in each of the unit time periods. The system may then generate a volume scaling modifier for each value in the set of values, wherein a sum of each of the values multiplied by its corresponding coefficient equals a sum of each of the values.

In some embodiments, the system may include a display device. If so, the system may display, on the display device, a graphic representation of the original demand variation level for the data set, the reduced demand variation level, and an identifier for the first customer. The system also may determine additional reduced demand variation levels that are associated with order shifting for other customers and display the additional reduced demand levels and customers on the display. The system may also include a user interface through which a user may select one or more of the customers for implementation of load leveling.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this document is to be construed as an admission that the embodiments described in this document are not entitled to antedate such disclosure by virtue of prior invention. As used in this document, the term "comprising" means "including, but not limited to."

As used in this document, a statement that a device or system is "in electronic communication with" another device or system means that devices or systems are configured to send data, commands and/or queries to each other via a communications network. The network may be a wired or wireless network such as a local area network, a wide area network, an intranet, the Internet or another network.

For purposes of the discussion below, a "print job" or "print shop order" refers to a logical unit of work that is to be completed for a customer by a print shop. For example, a print shop order may be a request from a customer to print, collate, and cut, staple and/or bind a set of documents. A job may include one or more print jobs from one or more clients. As another example, a print job may include producing credit card statements corresponding to a certain credit card company, producing bank statements corresponding to a certain bank, printing a document, producing credit cards, or the like. Although the disclosed embodiments pertain to print jobs, the disclosed methods and systems can be applied to jobs in general in other production environments, such as automotive manufacturing, semiconductor production and the like.

A "print shop" refers to an entity that includes multiple document production resources, such as printers, cutters, collators and the like. A print shop may be a freestanding entity including one or more print-related devices such as a printing service provider, or it may be a document production group within a corporation or other entity. Additionally, a print shop may communicate with one or more servers by way of a local area network or a wide area network, such as the Internet, the World Wide Web or the like.

A "cell" is a device or group of devices in a print shop that performs a processing function on a job. For example, in a print production environment, a cell may include the resources of a printer, a copier, a binder, a hole-punch, a collator, a sealer or any other equipment used to process a print job. A print shop may include multiple cells, each of which may repeat functions of other cells, or which may perform specific functions such as preparatory work, printing, or finishing.

This document describes a method of leveling load in a print shop to smooth demand, or reduce variability, by rescheduling one or more print jobs of one or more customers. By rescheduling one or more of the print jobs, overall variation in the demand is reduced. In some embodiments, the system also considers the customer and ensures that certain customers are not selected for rescheduling, or the system may select customers based on preference or ranking. Optionally, a graphic user interface ("GUI") may be available so that a user may compare the effects on demand variation that may result from rescheduling different print jobs, or by rescheduling the jobs of different customers. Optionally, the user may select one of the possible rescheduling options to shift demand while also taking into account customer considerations.

Figure 1:
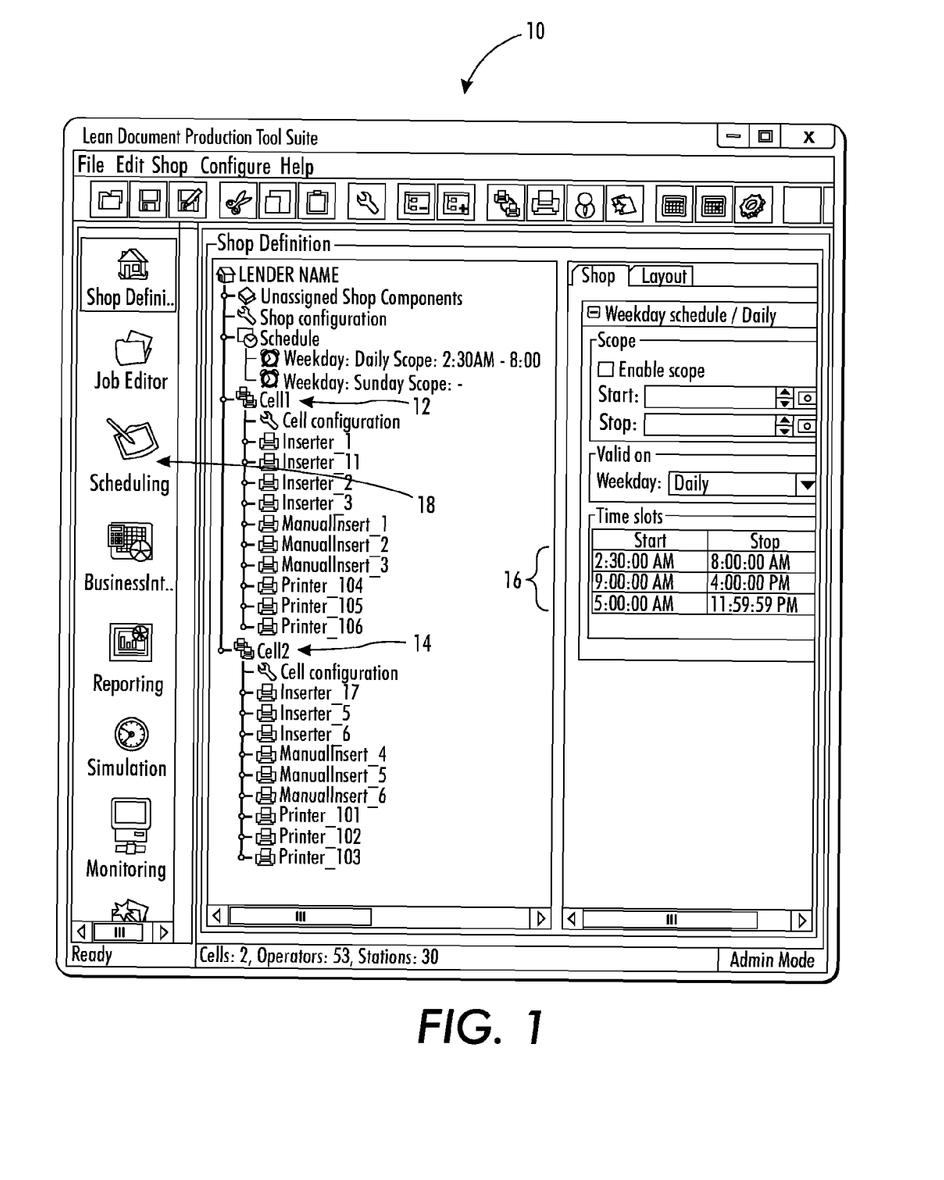
FIG. 1 illustrates an exemplary graphical user interface that an operator may use to monitor activities of a print shop.

FIG. 1 illustrates an exemplary GUI 10 that an operator may use to monitor activities of a print shop. The print shop contains two cells, Cell1 12 and Cell2 14. Each cell includes a set of print-related devices. For example, as shown Cell1 includes four automated and three manual inserters, along with three printers. Cell2 includes three of each type of inserter, along with three printers. The print shop operates on three shifts 16 during each weekday. During operation, the operator may select a scheduling function 18 in the GUI to view scheduled print jobs and modify the schedule as the operator sees fit.

Figure 2:
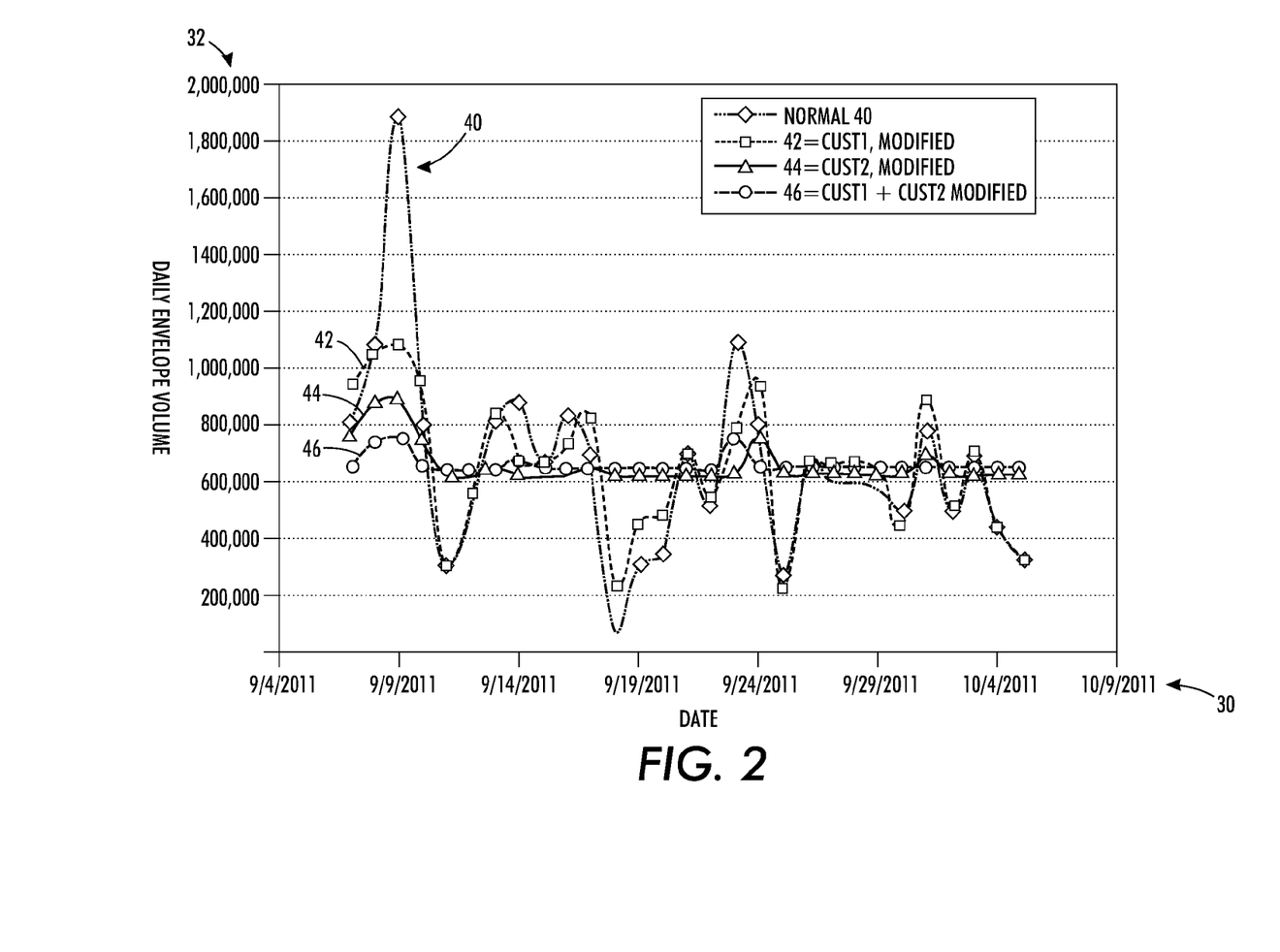
FIG. 2 illustrates an example of a data set of anticipated load for a print shop or a portion of a print shop over a set of prospective incremental time periods.

FIG. 2 illustrates an example of a data set of anticipated load for a print shop or a portion of a print shop over a set of prospective incremental time periods. For example, the data set may include a set of incremental time periods 30. As shown, the incremental time periods are 35 consecutive days between Sep. 4, 2011 and Oct. 9, 2011. The data set also may include a total demand measurement 32 for each time period. The demand measurement 32 may be a daily volume of all print jobs for the shop (or portion thereof), such as a number of pages to be printed, a number of envelopes to be printed, or a number of units of a multi-page publication to be printed. The demand measurement also may be a measurement of a consumable (such as toner or paper), or a measurement of the amount of time that a device must operate to complete the scheduled jobs.

The total demand measurement represents the anticipated or scheduled demand for all of the print shop's customers. A graphic representation, such as a line graph, bar graph, or alphanumeric chart, may illustrate the nominal (i.e., originally-scheduled) total demand measurement 40 for each of the time periods. The GUI also may illustrate a first modified total demand measurement 42, which shows how the total demand would change if the demand for one customer (Customer1) was altered (in an optimal sense described below). The GUI also may illustrate a second modified total demand measurement 44, which shows how the total demand would change if a different customer (Customer2) were load-leveled. The GUI also may illustrate a third modified total demand measurement 46, which shows how the total demand would change if the demand for both Customer1 and Customer2 was altered (in an optimal sense described below).

The GUI may display demand measurements for any number of possible load leveling scenarios, involving any number of customers or any combination of customers. As can be seen, the nominal demand may vary from a high of about 1,900,000 units to a low of about 75,000 units—representing a range of 1,825,000 units. However, the load leveled demands results in less variance. For examine, the load-leveled demand measurement for the Customer1 42 varies between about 200,000 and about 1,100,000 units—representing a total range of only about 900,000 units. Similarly it can be shown that the standard deviation from a mean demand level may be reduced from 1 (normalized non-load leveled) to about 0.3 if Customer1 is load leveled, or to about 0.23 if Customer2 is load leveled.

Figure 3:
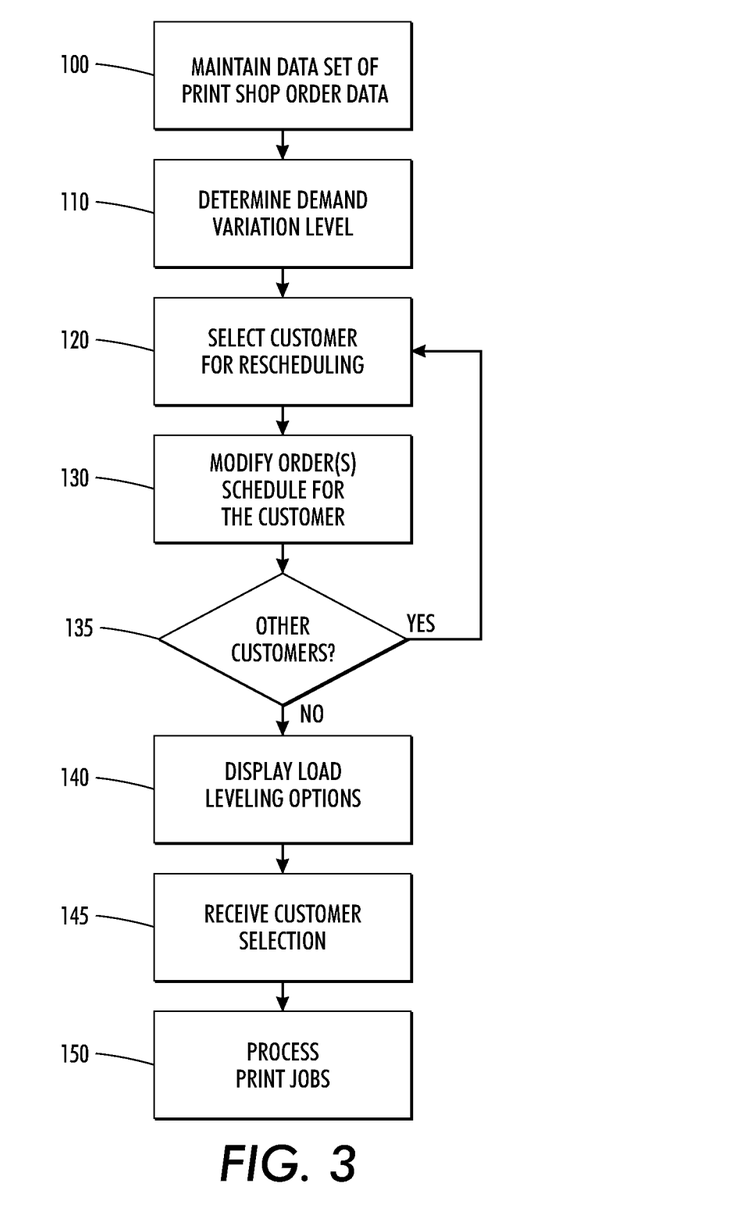
FIG. 3 is a flow chart illustrating how a system may perform load leveling in a print shop.

FIG. 3 is a flow chart illustrating how a system may perform load leveling in a print shop. The system may include a tangible computer-readable memory, a processor that implements programming instructions, a display, and a user interface, each of which is in electronic communication with at least one of the other devices. The system's memory may maintain 100 a data set of prospective print shop order data for multiple customers over a set of unit time periods. Each of the unit time periods has a corresponding demand level based on the prospective print shop order data for all customers during the time period. The print shop order data includes a measurement of the demand level for each print job, such as a number of pages or units to be printed, an amount of a consumable (such as toner) required for each print job, and/or an amount of time required to process the job.

The system may determine a demand variation level 110 that corresponds to a measurement of the how the demand levels may vary per unit time period. For example, referring back to FIG. 2 the demand variation level for the nominal data set may be 1,825,000 units. Alternatively, the demand variation for the nominal data set may be established as a standard deviation.

Referring again to FIG. 3, the system may then select 120 a first customer for rescheduling of print shop orders. The first customer has at least one print shop order that corresponds to a first unit time period. The system may then modify 130 at least one of the first customer's print shop orders so that the modified order has a revised processing period that corresponds to a second unit time period. The second unit time period differs from the first unit time period. The revised behavior differs from the original behavior so that movement of the modified order from the original processing period (i.e., the first unit time period) to the revised processing period (i.e., the second unit time period) reduces the demand variance level. For example, referring back to FIG. 2, the system may select Customer1 for load leveling and adjust the schedule of Customer1's jobs so that the standard deviation of the print shop's load is reduced from 1 to 0.3.

Referring back to FIG. 3, if other customers are candidates for load leveling 135, the system may repeat the selecting and modifying steps so that other load leveling options are available. The system may then present the load leveling options to a user 140 via a display so that the user can select one or more of the options for actual modification. For example, the display may show the demand variation level for the original data set along with the modified demand variation levels and customer identifiers for various load leveling options. The user may then select one of the available load leveling options 145 so that a particular customer, customers, job, or jobs are modified with load leveling, and the system may process 150 the jobs with the customer-selected load leveling.

Optionally, the user interface may allow the user to select a customer or customers for load leveling so that the user may compare the effects of load leveling specific customers. Alternatively, the system may automatically determine which customers are candidates for load leveling. For example, the system may present load leveling options for each of the print shop's customers. Alternatively, the system may only present load leveling options for customers that are selected by a user. Alternatively, the system may automatically exclude certain customers from load leveling. The excluded customers may be those whose load is relatively small, or those customers who are identified as being unwilling to have their schedules modified.

In some embodiments the system may identify only those customers whose orders account for at least a minimum percentage of total demand. This will help avoid performing or presenting load leveling options for those individual customers that have relatively little impact on the print shop's total demand.

To perform the load leveling (i.e., the modifying 130 in FIG. 3), the system may use a matrix-based load leveling algorithm. This may be illustrated by example. Suppose there is a collection of k customers (referred to in this document as customer descriptions, or "CD") such that the jobs within those customer descriptions share a common sequence of production operations, for example print and insert. In this illustration, we denote the customers as $CD_1, CD_2, CD_3, \ldots CD_k$. In this example, we assume a total duration of one month, and we establish daily time intervals throughout the month. We arrange the customer descriptions in order of largest monthly volume to smallest monthly volume, so that $CD_1$ is the largest customer and $CD_k$ is the smallest.

From the customers' print shop order data, the system creates a data set made of the matrix:

$$\begin{matrix} y_{11} & y_{12} & \ldots & y_{1m} \\ y_{21} & y_{22} & \ldots & y_{2m} \\ \ldots & \ldots & \ldots & \ldots \\ y_{k1} & y_{k2} & & y_{km} \end{matrix}$$

where each $y_{km}$ represents a unit of measure of the demand for customer k on the mth day. Accordingly, the first row corresponds to the daily volumes demanded by customer $CD_1$, the second row to that of $CD_2$, and so on until the last row which corresponds to $CD_k$.

If the elements are summed along each column of the above matrix, then we obtain the total production volume, or demand, for each day. More generally, we can consider the volume over some convenient production duration. Since daily volumes are assumed, the number of columns is m (where for example if the overall duration is a month and the demand is expressed on a per day basis then m assumes the value of about 30). So for example $y_{4,19}$ is the volume of customer 4 on the 19$^{th}$ day of the period of time, e.g., month. Depending on shop hours, weekends may or may not be included.

Next, the GUI permits a user to select customers that will be candidates for load leveling. When the user selects a customer, the customer's corresponding row in the above matrix will have its volume reallocated. In some embodiments, it may desirable for this number to be small so as to impact the fewest customers. Accordingly, the system may include prompts or limits that ensure that the user does not enter (or the system does not accept) more than a threshold number of load leveling candidates without proper authorization. Also the top rows of the matrix are generally most desirable to alter since they have the largest volume and can therefore have the largest impact. However, the user or the system may need to consider the likelihood that the customer would cooperate with redistributing their job scheduling, as well as the contribution of that customer to overall variance.

For illustration we select only the first row (customer $CD_1$) as a candidate to alter demand. To reallocate the demand of the first row consider m volume scaling modifiers, or coefficients $C_1, C_2, C_3, \ldots C_m$. Each coefficient is subject to, 1. The inequality constraint $C_i \geq 0$, for $i=1, \ldots m$ and,
2. The linear constraint $$\sum_{i=1}^{m} C_i \cdot y_{1i} = \sum_{i=1}^{m} y_{1i}.$$

The inequality constraint ensures non negative volumes. The second constraint maintains the total monthly volume for customer $CD_1$, by ensuring that the sum of each value multiplied by is coefficient equals the sum of each value without the multiplied coefficients.

The matrix above is then modified to be, $$\begin{matrix} C_1 \cdot y_{11} & C_2 \cdot y_{12} & \ldots & C_m \cdot y_{1m} \\ y_{21} & y_{22} & \ldots & y_{2m} \\ \ldots & \ldots & \ldots & \ldots \\ y_{k1} & y_{k2} & & y_{km} \end{matrix}$$

If the designer selects two customers to reallocate then there would be 2·m coefficients and so on (though in this case the optimal solution may become non unique).

The system then chooses the coefficients $C_i$, i=1, m, subject to the inequality constraints and linear constraint above, so as to minimize the function, $$J = \frac{1}{m-1} \sum_{i=1}^{m} (C_i \cdot y_{1i} + y_{2i} + \ldots y_{ki} - \overline{A})^2,$$

where $\overline{A}$ is the average daily volume and is independent of the values chosen for $C_i$. The function J is itself an estimate of the daily variance. By selecting the coefficients, so as to minimize J, the system in fact minimize the variance of the day to day volume. It is in this way that the system smoothes, or load levels, the demand throughout the month. For the single customer case this problem has a unique solution may be solved by quadratic programming.

Figure 4:
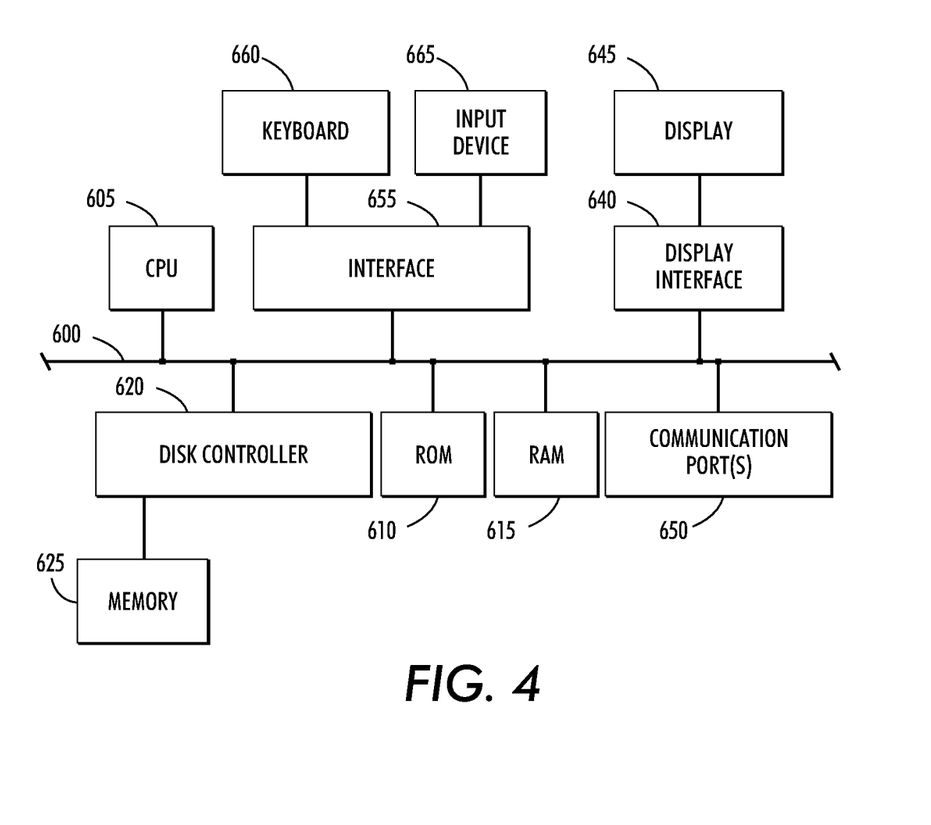
FIG. 4 illustrates a block diagram of exemplary internal hardware that may be used to contain or implement the program instructions according to an embodiment.

FIG. 4 depicts a block diagram of exemplary internal hardware that may be used to contain or implement the various services and processing devices as discussed above. A bus 600 serves as the main information highway interconnecting the other illustrated components of the hardware. CPU 605 is the central processing unit of the system, performing calculations and logic operations required to execute a program. CPU 605, alone or in conjunction with one or more of the other elements disclosed in FIG. 4 is an exemplary processing device, computing device or processor as such terms are used within this disclosure. Any or all of the programming instructions and data elements described in this document may be stored on computer readable media. A computer-readable medium is a tangible device that stores data and/or computer programming instructions so that the data and/or instructions may be accessed by a processing device. Read only memory (ROM) 610, random access memory (RAM) 615, and disk drives, hard drives, flash memory, USB drives and the like constitute exemplary memory devices that are tangible, computer-readable media.

A controller 620 provides an interface between with one or more optional tangible, computer-readable memory devices 625 and the system bus 600. These memory devices 625 may include, for example, an external or internal DVD drive, a CD ROM drive, a hard drive, flash memory, a USB drive or the like. As indicated previously, these various drives and controllers are optional devices. Additionally, the memory devices 625 may be configured to include individual files for storing any software modules or instructions, auxiliary data, common files for storing groups of results or auxiliary, or one or more databases for storing the result information, auxiliary data, and related information as discussed above.

Program instructions, software or interactive modules for performing any the methods and systems as discussed above may be stored in the ROM 610 and/or the RAM 615. Optionally, the program instructions may be stored on a tangible computer readable medium such as a compact disk, a digital disk, flash memory, a memory card, a USB drive, an optical disc storage medium, such as a Blu-ray™ disc, and/or other recording medium. As used in this document, the phrase "computer-readable storage medium" is intended to include any such computer-readable device or tangible structure (such as 610, 615 or 625). In addition, when this document refers to computer-readable storage media as a "first" computer-readable storage medium, "second" computer-readable storage medium, etc., the reference encompasses both separate structures as well as a single structure having multiple storage locations within the structure.

An optional display interface 640 may permit information from the bus 600 to be displayed on the display 645 in audio, visual, graphic or alphanumeric format. The information may include information related to a current job ticket and associated tasks. Communication with external devices may occur using various communication ports 650. An exemplary communication port 650 may be attached to a communications network, such as the Internet or an local area network.

The hardware may also include an interface 655 which allows for receipt of data from input devices such as a keyboard 660 or other input device 665 such as a mouse, a joystick, a touch screen, a remote control, a pointing device, a video input device and/or an audio input device.

Some or all of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A computer-implemented method of managing workflow for a print shop, comprising:
   maintaining, in a computer-readable medium, a data set comprising prospective print shop order data for a plurality of customers over a plurality of unit time periods, wherein each of the unit time periods has a corresponding demand level based on the prospective print shop order data for the unit time period;
   determining, by a processing device, a demand variation level that corresponds to a measurement of variation of the demand levels for each of the unit time periods;
   selecting, by the processing device, a first customer for rescheduling of print shop orders, wherein the first customer's print shop orders have an original processing period that corresponds to one of the unit time periods in the set;
   modifying, by the processing device, at least one of the first customer's print shop orders to yield a modified order that has a revised processing period, wherein modifying comprises:
     determining, by the processing device, a matrix from the data set, wherein each row in the matrix corresponds to a customer and each data point in each row of the matrix corresponds to a unit of measure for that row's customer's print shop orders per unit time period,
     determining a set of values for the first customer, wherein each value in the set of values corresponds to a measurement of the first customer's print shop orders in each of the unit time periods, and
     generating a volume scaling modifier for each value in the set of values, wherein a sum of each of the values multiplied by its corresponding coefficient equals a sum of each of the values, wherein generating comprises selecting a coefficient that minimizes the function:

$$J = \frac{1}{m-1} \sum_{i=1}^{m} (C_i \cdot y_{1i} + y_{2i} + \ldots y_{ki} - \overline{A})^2,$$

where $\overline{A}$ is the average daily volume and is independent of the values chosen for each coefficient;
   wherein the revised processing period differs from the original processing period and corresponds to a different one of the unit time periods of the set, so that movement of the modified order from the original processing period to the revised processing period reduces the demand variation level.

2. The method of claim 1, further comprising processing the modified order in the print shop during the revised processing period.

3. The method of claim 1, further comprising: displaying, on the display device, a graphic representation of:
   the demand variation level for the data set;
   the reduced demand variation level; and
   an identifier for the first customer.

4. The method of claim 1, further comprising:
   repeating the selecting and modifying for a second customer to yield a second reduced demand variation level based on a modified processing period for the additional customer;
   displaying, on a display device, a graphic representation of the second reduced demand variation level and an identifier for the second customer; and
   receiving, via a user interface, a selection of either the first customer or the second customer.

5. The method of claim 1, wherein generating the volume scaling modifier for each value comprises determining a set of coefficients that most reduces a variation of a total order volume in the print shop over each coefficient's corresponding unit time period.

6. The method of claim 1, further comprising, before the selecting and modifying steps:
receiving, via a user interface, a user selection of one or more candidate customers;
wherein selecting the first customer comprises selecting one of the candidate customers.

7. A print shop workflow management system comprising:
a processor;
a first computer-readable medium in electronic communication with the processor, the computer-readable medium containing a data set comprising prospective print shop order data for a plurality of customers over a plurality of unit time periods, wherein each of the unit time periods has a corresponding demand level based on the prospective print shop order data for the unit time period; and
a second computer-readable medium in electronic communication with the processor, the second computer-readable medium containing programming instructions that instruct the processor to:
determine a demand variation level that corresponds to a measurement of variation of the demand levels for each of the unit time periods,
select a first customer for rescheduling of print shop orders, wherein the first customer's print shop orders have an original processing period that corresponds to one of the unit time periods in the set, and
modify at least one of the first customer's print shop orders so that the modified order has a revised processing period, wherein modifying comprises:
determining a matrix from the data set, wherein each row in the matrix corresponds to a customer and each data point in each row of the matrix corresponds to a unit of measure for that row's customer's print shop orders per unit time period,
determining a set of values for the first customer, wherein each value in the set of values corresponds to a measurement of the first customer's print shop orders in each of the unit time periods, and
generating a volume scaling modifier for each value in the set of values, wherein a sum of each of the values multiplied by its corresponding coefficient equals a sum of each of the values, wherein generating comprises selecting a coefficient that minimizes the function:

$$J = \frac{1}{m-1} \sum_{i=1}^{m} (C_i \cdot y_{1i} + y_{2i} + \ldots y_{ki} - \overline{A})^2,$$

where $\overline{A}$ is the average daily volume and is independent of the values chosen for each coefficient,
wherein the revised processing period differs from the original processing period and corresponds to a different one of the unit time periods of the set, so that movement of the modified order from the original processing period to the revised processing period reduces the demand variation level.

8. The system of claim 7, further comprising additional programming instructions that instruct the processor to process the modified order in the print shop during the revised processing period.

9. The system of claim 7, further comprising:
a display device, and
additional programming instructions that instruct the processor to display, on the display device, a graphic representation of:
the demand variation level for the data set;
the reduced demand variation level; and
an identifier for the first customer.

10. The system of claim 7, further comprising:
a user interface; and
additional programming instructions that instruct the processor to:
repeat the selecting and modifying for a second customer to yield a second reduced demand variation level based on a modified processing period for the additional customer;
display, on the display device, a graphic representation of the second reduced demand variation level and an identifier for the second customer; and
receive, via the user interface, a selection of either the first customer or the second customer.

11. The system of claim 10 further comprising additional programming instructions that instruct the processor to:
receive, via the user interface, a user selection of one or more candidate customers;
wherein the instructions that cause the processor to select the first customer comprise instructions that cause the processor to select one of the candidate customers as the first customer.

12. The method of claim 7, wherein the instructions that cause the processor to generate a volume scaling modifier further comprise instructions that cause the processor to determine a set of coefficients that most reduces the variation of a total order volume in the print shop over each coefficient's corresponding unit time period.

13. A computer-implemented method of managing print shop workflow, comprising:
maintaining, in a computer-readable medium, a data set comprising prospective print shop order data for a plurality of customers over a plurality of unit time periods, wherein each of the unit time periods has a corresponding demand level based on the prospective print shop order data for the unit time period;
determining, by a processing device, a demand variation level that corresponds to a measurement of a range between a high demand level and a low demand level over each of the unit time periods;
selecting, by the processing device, a plurality of candidate customers for rescheduling of print shop orders, wherein each candidate customer's print shop orders have an original processing period that corresponds to one of the unit time periods in the set;
determining a matrix from the data set, wherein each row in the matrix corresponds to one of the selected candidate customers and each data point in each row of the matrix corresponds to a unit of measure for that row's candidate customer's print shop orders per unit time period;
determining a set of values for the each of the candidate customers, wherein each value in the set of values corresponds to a measurement of the candidate customer's print shop orders in each of the unit time periods;
generating a volume scaling modifier for each value in the set of values, wherein a sum of each of the values multiplied by its corresponding coefficient equals a sum of each of the values, wherein generating the volume scaling modifier comprises selecting a coefficient that minimizes the function:

$$J = \frac{1}{m-1}\sum_{i=1}^{m}(C_i \cdot y_{1i} + y_{2i} + \ldots y_{ki} - \overline{A})^2,$$

where $\overline{A}$ is the average daily volume and is independent of the values chosen for each coefficient;

preparing, by the processing device, a proposal to modify a first candidate customer's print shop orders so that the proposal includes a revised processing period for an order of the first candidate customer, wherein the revised processing period differs from that order's original processing period and corresponds to a different one of the unit time periods of the set, so that movement of the order from its original processing period to its revised processing period reduces the demand variation level; and presenting the proposal to a user.

14. The method of claim 13, further comprising:

receiving, via a user interface, a selection of the proposal, and processing the first candidate customer's order in the print shop during the revised processing period.

\* \* \* \* \*